US010174241B2

(12) United States Patent
Eoff et al.

(10) Patent No.: US 10,174,241 B2
(45) Date of Patent: Jan. 8, 2019

(54) METHODS FOR IMPROVING THE DISTRIBUTION OF A SEALANT COMPOSITION IN A WELLBORE AND TREATMENT FLUIDS PROVIDING THE SAME

(71) Applicant: Halliburton Energy Services, Inc., Houston, TX (US)

(72) Inventors: Larry Steven Eoff, Duncan, OK (US); B. Raghava Reddy, The Woodlands, TX (US); Natalie Pascarella, Houston, TX (US); Amare Mebratu, Stavanger (NO)

(73) Assignee: Halliburton Energy Services, Inc., Houston, TX (US)

( * ) Notice: Subject to any disclaimer, the term of this patent is extended or adjusted under 35 U.S.C. 154(b) by 121 days.

(21) Appl. No.: 15/033,205

(22) PCT Filed: Feb. 18, 2014

(86) PCT No.: PCT/US2014/016912
§ 371 (c)(1),
(2) Date: Apr. 29, 2016

(87) PCT Pub. No.: WO2015/126364
PCT Pub. Date: Aug. 27, 2015

(65) Prior Publication Data
US 2016/0355726 A1    Dec. 8, 2016

(51) Int. Cl.
*C09K 8/08*    (2006.01)
*C09K 8/68*    (2006.01)
(Continued)

(52) U.S. Cl.
CPC ........... *C09K 8/685* (2013.01); *C09K 8/08* (2013.01); *C09K 8/44* (2013.01); *C09K 8/508* (2013.01);
(Continued)

(58) Field of Classification Search
CPC .. C09K 8/68; C09K 8/685; C09K 8/08; E21B 21/003; E21B 33/138; E21B 43/267
See application file for complete search history.

(56) References Cited

U.S. PATENT DOCUMENTS 5,547,026 A    8/1996   Brannon et al.
6,196,317 B1   3/2001   Hardy
(Continued)

FOREIGN PATENT DOCUMENTS

WO    2013115845 A1   8/2013
WO    2015126364 A1   8/2015

OTHER PUBLICATIONS

International Search Report and Written Opinion for PCT/US2014/016912 dated Nov. 13, 2014.

*Primary Examiner* — Zakiya W Bates
*Assistant Examiner* — Crystal J Miller
(74) *Attorney, Agent, or Firm* — McGuireWoods LLP (57) ABSTRACT

Methods for forming a fluid seal in a subterranean formation may comprise: providing a treatment fluid comprising an aqueous carrier fluid, a sealant composition, and a crosslinked polysaccharide composition. The treatment fluid is introduced into a wellbore penetrating a subterranean formation and the crosslinked polysaccharide composition is formed into a viscosified gel in the wellbore. The viscosified gel substantially spans the diameter of the wellbore and holds the sealant composition in place. After forming the
(Continued)

crosslinked polysaccharide composition into a viscosified gel in the wellbore, forming a fluid seal in the wellbore with the sealant composition.

16 Claims, 3 Drawing Sheets

(51) Int. Cl.
    *C09K 8/508*     (2006.01)
    *C09K 8/512*     (2006.01)
    *C09K 8/514*     (2006.01)
    *C09K 8/88*     (2006.01)
    *C09K 8/90*     (2006.01)
    *C09K 8/44*     (2006.01)
    *E21B 21/00*     (2006.01)
    *E21B 33/138*     (2006.01)
    *E21B 43/267*     (2006.01)

(52) U.S. Cl.
    CPC .............. *C09K 8/512* (2013.01); *C09K 8/514* (2013.01); *C09K 8/882* (2013.01); *C09K 8/887* (2013.01); *C09K 8/90* (2013.01); *E21B 21/003* (2013.01); *E21B 33/138* (2013.01); *E21B 43/267* (2013.01)

(56) References Cited

U.S. PATENT DOCUMENTS

| | | | |
|---|---|---|---|
| 7,091,160 | B2 | 8/2006 | Dao et al. |
| 7,267,174 | B2 | 9/2007 | Gonsveld et al. |
| 7,287,587 | B2 | 10/2007 | Reddy et al. |
| 7,322,414 | B2 | 1/2008 | Reddy et al. |
| 7,325,613 | B2 | 2/2008 | Reddy et al. |
| 7,331,390 | B2 | 2/2008 | Eoff et al. |
| 7,488,705 | B2 | 2/2009 | Reddy et al. |
| 7,690,429 | B2 | 4/2010 | Creel et al. |
| 8,322,421 | B2 | 12/2012 | Reddy et al. |
| 8,343,896 | B2 * | 1/2013 | Eoff ........................ C04B 28/02 166/295 |
| 8,522,874 | B2 | 9/2013 | Reddy et al. |
| 2006/0234871 | A1 | 10/2006 | Dalrymple et al. |
| 2010/0036017 | A1 * | 2/2010 | Eoff ........................ C04B 28/02 523/130 |
| 2011/0214866 | A1 | 9/2011 | Reddy et al. |
| 2013/0000905 | A1 | 1/2013 | Reddy et al. |
| 2013/0000911 | A1 | 1/2013 | Reddy et al. |

* cited by examiner

METHODS FOR IMPROVING THE DISTRIBUTION OF A SEALANT COMPOSITION IN A WELLBORE AND TREATMENT FLUIDS PROVIDING THE SAME

BACKGROUND

The present disclosure generally relates to forming a fluid seal in a wellbore, and, more specifically, to methods and treatment fluids that promote the formation of a fluid seal in a wellbore with enhanced uniformity.

Treatment fluids can be used in a variety of subterranean operations. Such subterranean operations can include, without limitation, drilling operations, stimulation operations, production operations, remediation operations, sand control treatments and the like. As used herein, the terms "treat," "treatment," "treating" and other variants thereof refer to any subterranean operation that uses a fluid in conjunction with achieving a desired function and/or for a desired purpose. Use of these terms does not imply any particular action by the treatment fluid or a component thereof unless expressly described as such herein. Illustrative treatment operations can include, for example, fracturing operations, gravel packing operations, acidizing treatments, scale dissolution and removal operations, consolidation operations, conformance control operations, and the like.

When performing a subterranean treatment operation, including those noted above, it can sometimes be desirable to temporarily or permanently block or divert the flow of a fluid within at least a portion of the subterranean formation by forming a fluid seal therein. The formation of a fluid seal can itself be considered a treatment operation. Whether the fluid seal is intended to be temporary or permanent can determine the type of agent used in its formation. Illustrative fluid blocking and diversion operations can include, without limitation, fluid loss control operations, kill operations, conformance control operations, and the like. The fluid that is being blocked or diverted can be a formation fluid that is natively present in the subterranean formation, such as petroleum, gas, or water. In other cases, the fluid that is being blocked or diverted can be a treatment fluid, including the types mentioned above. In some cases, treatment fluids can be formulated to be self-diverting, such that they are automatically directed to a desired location within the subterranean formation.

Providing effective fluid loss control during subterranean treatment operations can be highly desirable. The term "fluid loss," as used herein, refers to the undesired migration or loss of fluids into a subterranean formation and/or a particulate pack. Fluid loss can be problematic in a number of subterranean operations including, for example, drilling operations, fracturing operations, acidizing operations, gravel-packing operations, workover operations, chemical treatment operations, wellbore clean-out operations, and the like. In fracturing operations, for example, fluid loss into the formation matrix can sometimes result in incomplete fracture propagation. Formation of a fluid seal in such treatment operations can mitigate the migration of a fluid into an unwanted location of the subterranean formation.

Likewise, in the reverse of a fluid loss event, incomplete fluid blocking can result in production of an unwanted fluid from one or more zones of a subterranean formation. For example, incomplete formation of a fluid seal may result in the unwanted incursion of formation water or brine into a wellbore, which may decrease the value of a hydrocarbon resource produced therefrom.

Gelled polymers, also synonymously referred to herein as viscosified gels, can be used to form a fluid seal in various subterranean operations.

As used herein, a "gelled polymer" or "viscosified gel" refers to a polymer in semi-solid form that has at least a portion of its polymer chains crosslinked with one another via a crosslinking agent. Gelled polymers can be further classified based upon their properties following gelation. "Lipping gels" or "tonguing gels" refer to crosslinked polymers that are more viscous than a freely pouring fluid phase, but have low gel strengths. They often form a retractable "tongue" over the edge of a container from which they are being poured. "Rigid gels" or "ringing gels," in contrast, have higher gel strengths and generally refer to crosslinked polymers that are substantially non-flowing and maintain dimensional stability when in their crosslinked state. The properties of a particular gelled polymer can determine the types of treatment operations in which it may be most effectively used. Lipping gels are most typically used to provide viscosity to a treatment fluid during the treatment fluid's introduction to a subterranean formation. For example, lipping gels may be used to increase the viscosity of a fracturing fluid so that the fracturing fluid can effectively transport proppant particulates. Rigid gels, in contrast, are more typically used to form a temporary or permanent fluid seal in a subterranean formation. Generally, the two types of gels are complementary to one another in their use, and they are not usually thought to be operationally interchangeable with one another, although they may, at times, bear some similarity to one another from a viscosity standpoint. In this regard, lipping gels may be used for some conformance applications.

Various modes of crosslinking are possible in a gelled polymer. The crosslinks can be in the form of a covalent bond, a non-covalent bonding interaction, or any combination thereof. The crosslinks can be temporary or permanent. Chromium, titanium, zirconium and other transition metal ions can be used to crosslink certain types of crosslinkable polymers, including polysaccharides. Any suitable salt form of the transition metal ions, including ligated and solution forms, may be used to affect crosslinking. Borate or polyfunctional borate crosslinking agents can be used in a like manner. Polymer-based crosslinking agents may be used to affect crosslinking in other instances. A number of factors may determine the type of crosslinking agent chosen for a particular crosslinkable polymer, such as the desired gel time and gel strength, as well as the temperature and chemistry of a subterranean formation in which the crosslinkable polymer is deployed. For example, in higher temperature subterranean formations (e.g., above about 175° F.), polymer-based crosslinking agents may be more desirable than are transition metal ions due to uncontrolled crosslinking rates with the latter. As used herein, the term "gel time" refers to the time needed for an initially uncrosslinked polymer to form a substantially gelled state.

Due to their higher gel strengths, rigid gels are ordinarily used when forming a fluid seal in a subterranean formation. When forming a fluid seal with a rigid gel, the polymer and the crosslinking agent are usually introduced to the subterranean formation in a substantially non-crosslinked, low viscosity state. Otherwise, high viscosities would lead to difficult pumping, including high pump pressures and possible unintended fracturing, thereby making proper placement of the fluid seal problematic. Once the polymer and the crosslinking agent have reached their intended location in a subterranean formation, gelation can then take place to form a fluid seal. However, gelation does not take place instantaneously and is dictated by a number of factors including, for example, the nature of the polymer, the crosslinking agent, the formation temperature, and the downhole placement time, among other factors.

Because the polymer compositions that form rigid gels are fairly low in viscosity in their uncrosslinked state, they are often prone to slumping within a wellbore due to the influence of gravity before gelation occurs. Slumping can make it difficult to maintain an ungelled polymer in a desired location of the wellbore or to achieve an isotropic distribution of the ungelled polymer throughout the formation permeability while waiting for gelation to occur, often resulting in creation of an ineffective or incomplete fluid seal. Pressure differentials within a wellbore may also cause similar difficulties. Slumping effects may be particularly problematic in deviated wellbores having a substantially horizontal section, often resulting in ineffective generation of a fluid seal on an upper portion of the formation face. This issue can be especially problematic when well screens or slotted liners are present. Slumping and other types of polymer displacement issues may also be problematic in other wellbore configurations, including substantially vertical wellbore configurations. Although slumping may be combated to a certain degree by including an additive that hastens gelation, this approach may not be practical in all cases due to the risk of premature gelation occurring before the polymer has reached its intended downhole location. Even then, there may still be enough delay before gelation occurs to preclude formation of a sufficiently uniform fluid seal over the entire width of the wellbore. At present, there are not believed to be reliable options for placing a sealant composition in a wellbore without taking measures to account for slumping effects.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

The present disclosure generally relates to forming a fluid seal in a wellbore, and, more specifically, to methods and treatment fluids that promote the formation of a fluid seal in a wellbore with enhanced uniformity.

One or more illustrative embodiments incorporating the features of the present disclosure are presented herein. Not all features of a physical implementation are described or shown in this application for the sake of clarity. It is to be understood that in the development of a physical embodiment incorporating the features of the present disclosure, numerous implementation-specific decisions must be made to achieve the developer's goals, such as compliance with system-related, business-related, government-related and other constraints, which may vary by implementation and from time to time. While a developer's efforts might be time-consuming, such efforts would be, nevertheless, a routine undertaking for one of ordinary skill in the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps.

As discussed above, slumping can be a significant problem when forming a fluid seal from a low viscosity sealant composition and can compromise the likelihood of success in various subterranean operations. The present inventors discovered that slumping of a sealant composition in a wellbore may be mitigated by increasing a treatment fluid's viscosity in a manner that leaves the sealant composition's crosslinking profile relatively unaltered. As used herein, a sealant composition will be considered to have a relatively unaltered crosslinking profile if it forms a gelled state with similar properties over a comparable timeframe to that of an unmodified treatment fluid containing the sealant composition. Although sealant compositions of the present disclosure may have a similar crosslinking profile and gel characteristics to those in a corresponding unmodified treatment fluid, this is not to imply that the gel strengths or gel times are identical, simply that they are close enough to provide similar operational functionality.

More particularly, the present inventors discovered that by combining two complementary gelable polymer compositions in a treatment fluid, the crosslinking profile of neither polymer was significantly impacted. Without being bound by any theory or mechanism, it is believed that one of the gelable polymer compositions provides initial viscosity to the treatment fluid, which then decreases the propensity of the other gelable polymer composition to undergo slumping, as discussed in more detail below. In some embodiments, the gel times and gel strengths of the two gelable polymer compositions are additive within the treatment fluid. That is, the combined gel strength of the resulting fluid seal is the additive gel strength of the two gelable polymers. In other embodiments, the combined gel strength is independent of the two gelable polymers.

Still more particularly, the present inventors discovered that by combining a crosslinked polysaccharide composition with a sealant composition in a treatment fluid, viscosity-promoted slumping of the sealant composition may be addressed while not significantly impacting the crosslinking profile of either polymer. Crosslinked polysaccharide compositions generally form lipping gels, such as those commonly used to provide viscosity in fracturing operations.

Without being bound by any theory or mechanism, it is believed that the lipping gel of a crosslinked polysaccharide composition can provide an initially viscous, yet pumpable, treatment fluid that can convey the sealant composition to an intended wellbore location. Upon placement in a desired location of the wellbore, the viscosity of the crosslinked polysaccharide composition can be further increased to provide a supporting structure for the sealant composition while the sealant composition crosslinks to form a fluid seal over time, thereby mitigating slumping effects. As the sealant composition begins to crosslink, the initial lipping gel of the crosslinked polysaccharide composition may be superseded by the formation of a rigid gel of the sealant composition. In some embodiments, the lipping gel of the crosslinked polysaccharide composition may be maintained once the fluid seal is formed, and in other embodiments, the lipping gel of the crosslinked polysaccharide composition may be broken as the fluid seal is formed. Due to the initial supporting structure of the lipping gel, the sealant composition may be much less prone to slumping or other unwanted movement prior to gelation.

The combination of a crosslinked polysaccharide composition and a sealant composition in a single treatment fluid may provide a number of benefits in a treatment operation. For example, use of such a combined treatment fluid may allow a fluid seal to be placed in a desired location in a wellbore without resorting to complicated fluid diversion strategies, which may be costly and/or time consuming. Further, since treatment fluids containing crosslinked polysaccharide compositions are generally thixotropic, the combined treatment fluid may be thixotropic as well, thereby allowing the treatment fluid to remain easily introducible into a wellbore in a low viscosity state, similar to the introduction state of the sealant composition alone. As used herein, the term "thixotropic" refers to fluid that has a low viscosity under a shearing force but undergoes a viscosity increase once the shearing force is lessened. That is, the treatment fluids described herein may be in a low viscosity state during their introduction under shear to subterranean formation, and attain a higher viscosity state that supports the sealant composition after pumping is complete and the treatment fluid has reached its intended location within a wellbore that is in need of formation of a fluid seal.

The treatment fluids described herein contain sealant compositions that are compatible with a variety of crosslinking agents used in conjunction with gelling polysaccharides. In this regard, both transition metal ions and borate ions may be used effectively in the crosslinked polysaccharide compositions of the present treatment fluids without appreciably impacting the gelation properties of a sealant composition, particularly sealant compositions comprising an organic crosslinking agent. That is, the inventors found a beneficial and surprising result that organic and inorganic crosslinking agents do not detrimentally interact with one another in the embodiments described herein. By judicious inclusion of gel time modifiers and/or by selecting suitable base polymers, for example, undesirable modifications to the gel time or gel strength of the sealant composition may be effectively compensated for according to the embodiments described herein. For example, when metal ions are used to crosslink a polysaccharide, the base polymer in the sealant composition (e.g., polyacrylamide) may be selected such that it contains a low level of carboxylic acid groups (e.g., about 0.1% or below) so as to minimize the possibility of crosslinking the base polymer with the metal ion. Synthetic homopolymers and copolymers may be designed to have low levels of available carboxylic acid groups. Likewise, when metal ion or borate ion crosslinkers are used to crosslink a polysaccharide, suitable gel time accelerators or gel time retarders can be added to promote a desired crosslinking time of the sealant composition.

In addition to the fluid sealing embodiments described above, the treatment fluids described herein can also be used in other types of treatment operations that employ a viscosified fluid phase, particularly those that utilize a particulate suspension in performing the treatment operation. Among the treatment operations in which the present treatment fluids may be used include, for example, fracturing operations, gravel packing operations, and other stimulation operations, such as acidizing operations. In addition to the benefits described above in forming a fluid seal without substantial slumping, the treatment fluids described herein may be further advantageous in the foregoing treatment operations and others by serving one or more other functions in addition to forming a fluid seal in a wellbore. For example, the crosslinked polysaccharide composition may provide viscosity to the treatment fluid to promote the support and transportation of proppant particulates in a fracturing operation. By having the sealant composition present in a fracturing fluid, generated fractures may be sealed soon after they are formed, which may be desirable in certain situations, such as permanently sealing of water-out perforations, refracturing operations, and the like. Likewise, the present treatment fluids may also be beneficial in forming a fluid seal following other types of stimulation operations.

In various embodiments, treatment fluids described herein may comprise an aqueous carrier fluid, a sealant composition, and a crosslinked polysaccharide composition. In various embodiments, the treatment fluid may be thixotropic.

In some embodiments, the treatment fluids described herein may have a viscosity of about 500 cP or less when shear is being applied thereto. At these viscosity levels, the treatment fluids may remain readily pumpable for introduction into a subterranean formation. Typical shear rates may be about 40 $cm^{-1}$ or more to attain such viscosity values. In some embodiments, the treatment fluids may have a viscosity of about 300 cP or less or about 200 cP or less when shear is being applied thereto. In still other embodiments, the treatment fluids may have a viscosity ranging between about 50 cP and about 200 cP or between about 100 cP and about 250 cP when shear is being applied thereto. The viscosity increases after shear is decreased or removed. After shear is decreased or removed, the final viscosity values may range between about 10,000 cP to about 100,000 cP. Higher final viscosity values are possible in some embodiments, such as about 100,000 cP to about 500,000 cP or about 100,000 cP to about 300 cP.

In other embodiments, the treatment fluids described herein develop viscosities due to crosslinking of the polysaccharide in less than about 15 minutes, alternately less than about 10 minutes, and crosslinking of the sealant composition takes place at periods longer than about 2 hours, alternately longer than about 4 hours. In some embodiments, the ratio of static viscosities of the gels formed following crosslinking of the polysaccharide and crosslinking of the sealant composition may be about 1:10 or greater, alternately about 1:1000 or greater, and still further alternately about 1:100,000 or greater. In some embodiments, the gels formed from crosslinking the polysaccharide may be ranked by the letter grades B (highly flowing gel) to C (moderately flowing gel), and the gels formed following crosslinking of the sealant composition may be ranked by the letter grades H (slightly deformable non-flowing gel) to J (rigid ringing gel). These gel grades will be familiar to one having ordinary skill in the art.

Suitable aqueous carrier fluids may include, for example, fresh water, acidified water, salt water, seawater, brine (e.g., a saturated salt solution), or an aqueous salt solution (e.g., a non-saturated salt solution). Water-miscible organic solvents may also be present. In some embodiments, the aqueous carrier fluids may also comprise small amounts of hydrocarbons such that the aqueous carrier fluid still remains as the treatment fluid's continuous phase. The small amounts of hydrocarbons may be introduced from any source. For example, some of the polymers suitable for use in the present embodiments may be obtained as an emulsion in a hydrocarbon base fluid, such as oil. It is not believed that small amounts of hydrocarbons, when present, significantly impact the treatment fluid's performance in forming a gel.

In some embodiments, the treatment fluids described herein may comprise an aqueous salt solution as their aqueous carrier fluid. Such aqueous salt solutions may have a salt concentration ranging between about 0.1% and about 10% by weight in some embodiments. The salt concentration may range between about 1% and about 10% by weight in some embodiments, between about 1% and about 3% by weight in other embodiments, or between about 2% and about 5% by weight in still other embodiments.

In some embodiments, the treatment fluids described herein may comprise a crosslinked polysaccharide composition that comprises a polysaccharide and a crosslinking agent, particularly an inorganic crosslinking agent. Suitable polysaccharides and crosslinking agents are discussed in more detail below.

The concentrations of the polysaccharide and the crosslinking agent used for crosslinking the polysaccharide may vary over a wide range in the present treatment fluids. In various embodiments, the desired viscosity of the treatment fluid may dictate the chosen concentration of each. In various embodiments, the concentration of the polysaccharide may range between about 0.05 wt. % to about 5 wt. % of the treatment fluid, or between about 0.1 wt. % to about 3 wt. % of the treatment fluid, or between about 0.15 wt. % to about 2 wt. % of the treatment fluid. In various embodiments, the concentration of the crosslinking agent (i.e., an inorganic crosslinking agent) may range between about 0.001 wt. % to about 1 wt. % of the treatment fluid, or between about 0.005 wt. % to about 0.5 wt. % of the treatment fluid, or between about 0.01 wt. % to about 0.1 wt. % of the treatment fluid.

In various embodiments, the crosslinking agent of the crosslinked polysaccharide composition may comprise an inorganic crosslinking agent. Suitable inorganic crosslinking agents may include a metal ion crosslinker, a borate crosslinker, or any combination thereof. Suitable metal ion crosslinkers may include transition metal ions such as, for example, chromium, titanium, copper, and zirconium. Other transition metal ions may also induce crosslinking of the polysaccharide in a like manner. Main group metal ions such as aluminum, for example, may also be used to induce crosslinking of the polysaccharide. Suitable borate crosslinking agents may include, for example, a borate ion or a multifunctional borate ion.

In various embodiments, the polysaccharide of the crosslinked polysaccharide composition may comprise a guar. Suitable guars may include, for example, guar, hydroxyethyl guar, hydroxypropyl guar, carboxymethyl guar, carboxymethylhydroxyethyl guar, and carboxymethylhydroxypropyl guar. Other guars may also be suitable. Other polysaccharides and derivatives thereof that may be crosslinked in a related manner and suitable for use in the embodiments described herein include, for example, xanthan, scleroglucan, succinoglycan, diutan, and cellulose derivatives (e.g., hydroxyethyl cellulose, carboxyethylcellulose, carboxymethylcellulose, and carboxymethylhydroxyethylcellulose).

In various embodiments, the sealant composition used in the treatment fluids described herein may comprise a base polymer and an organic crosslinking agent. Suitable base polymers and organic crosslinking agents are discussed in more detail below.

The concentrations of the base polymer and the organic crosslinking agent used for crosslinking it may vary over a wide range in the present treatment fluids. In various embodiments, the mechanical strength (i.e., gel strength) of the fluid seal formed therefrom may dictate the chosen concentration of each. Temperature of the wellbore may also be a determining factor in still other embodiments. In various embodiments, the concentration of the base polymer may range between about 3 wt. % to about 20 wt. % of the treatment fluid, or between about 5 wt. % to about 15 wt. % of the treatment fluid, or between about 7 wt. % to about 10 wt. % of the treatment fluid. Choice of the concentration of the base polymer in the treatment fluid may be dictated, at least to some degree, by the polymer's molecular weight, which may influence the viscosity of the treatment fluid even before crosslinking occurs. In various embodiments, the concentration of the organic crosslinking agent may range between about 0.005 wt. % to about 3.5 wt. % of the treatment fluid, or between about 0.1 wt. % to about 2.5 wt. % of the treatment fluid, or between about 0.3 wt. % to about 1.5 wt. %, or between about 0.15 wt. % to about 0.45 wt. % of the treatment fluid.

In various embodiments, the organic crosslinking agent used in the sealant composition may comprise a crosslinking polymer. Suitable crosslinking polymers may include, for example, polyalkyleneimines and polyalkylenepolyamines, any derivative thereof, any salt thereof, and any combination thereof. In more specific embodiments, suitable crosslinking polymers may include, for example, polyethyleneimine, polyvinylamine (polyethylenepolyamine), any derivative thereof, any salt thereof, and any combination thereof. In alternative embodiments, suitable crosslinking polymers may include, for example, polypropyleneimine, polypropylenepolyamine, polyallylamine, any derivative thereof, any salt thereof, and any combination thereof. In yet other alternative embodiments, the organic crosslinking agent may comprise amine-containing biopolymers such as, for example, chitosan, polymyxins, polylysine, any derivative thereof, any salt thereof, and any combination thereof.

In other various embodiments, the organic crosslinking agent may comprise a non-polymeric difunctional organic molecule. Suitable non-polymeric difunctional organic molecules may include, for example, dialdehydes, diamines (including polyethylene oxide diamines), oligomeric amines (e.g., diethylenetriamine, triethylenetetramine, and the like), and the like. In various embodiments, the organic crosslinking agent may be a combination of two or substances. Illustrative examples of such crosslinking agents may include phenol/formaldehyde, phenol acetate/hexamethylenetetramine, phenol/paraformaldehyde, and the like.

In various embodiments, the base polymer may comprise an acrylamide monomer unit or a derivative thereof. Suitable base polymers may include, for example, polyacrylamide, acrylamide copolymers, and partially hydrolyzed variants thereof. As used herein, an acrylamide polymer will be considered to be partially hydrolyzed if a portion, but not all, of its acrylamide monomer units have been hydrolyzed to acrylic acid monomer units. In some embodiments, the corresponding methacrylamide polymers or copolymers or acrylamide/methacrylamide copolymers or their hydrolyzed variants may be used.

In some embodiments, the base polymer comprising an acrylamide monomer unit or a derivative thereof may be a partially hydrolyzed polyacrylamide, a partially hydrolyzed polymethacrylamide, or a salt thereof. Suitable salt forms for the corresponding acrylic acid or methacrylic acid monomer units can include, for example, alkali metal salts (e.g., lithium, sodium, or potassium salts) or ammonium ($NH_4^+$) salts. A number of partially hydrolyzed polyacrylamides and polymethacylamides having a variety of molecular weights and degrees of hydrolysis are known in the art and can be used in the various embodiments described herein. In some embodiments, a partially hydrolyzed polyacrylamide or partially hydrolyzed polymethacrylamide may have up to about 30% of its side chain amide groups hydrolyzed to carboxylic acids. In some embodiments, a partially hydrolyzed polyacrylamide or partially hydrolyzed polymethacrylamide may have up to about 20% of its side chain amide groups hydrolyzed to carboxylic acids. In some embodiments, a partially hydrolyzed polyacrylamide or partially hydrolyzed polymethacrylamide may have up to about 10% of its side chain amide groups hydrolyzed to carboxylic acids. In some embodiments, a partially hydrolyzed polyacrylamide or partially hydrolyzed polymethacrylamide may have up to about 5% of its side chain amide groups hydrolyzed to carboxylic acids. In some embodiments, a partially hydrolyzed polyacrylamide or partially hydrolyzed polymethacrylamide may have up to about 2% of its side chain amide groups hydrolyzed to carboxylic acids. In some embodiments, a partially hydrolyzed polyacrylamide or partially hydrolyzed polymethacrylamide may have up to about 1% of its side chain amide groups hydrolyzed to carboxylic acids. In some embodiments, a partially hydrolyzed polyacrylamide or partially hydrolyzed polymethacrylamide may have up to about 0.5% of its side chain amide groups hydrolyzed to carboxylic acids. In some embodiments, a partially hydrolyzed polyacrylamide or partially hydrolyzed polymethacrylamide may have up to about 0.1% of its side chain amide groups hydrolyzed to carboxylic acids.

In some embodiments, a copolymer containing an acrylamide monomer unit may comprise the sealant composition. In some embodiments, the copolymer may comprise a copolymer of acrylamide and an acrylate ester. In more specific embodiments, the copolymer may comprise a copolymer of acrylamide and t-butyl acrylate. In alternative embodiments, copolymers of acrylamide and/or methacrylamide with monomers such as, for example, ethylene, propylene, styrene, maleic anhydride, 2-acrylamido-2-methylpropanesulfonic acid, vinylpyrrolidone, N,N-dimethylacrylamide, and the like, may be used in the sealant composition. Partial hydrolysis of the acrylamide or methacrylamide monomer units may also be present in such polymers.

In some embodiments, suitable base polymers for use in the present treatment fluids may comprise a copolymer selected from the group consisting of a partially hydrolyzed polyacrylamide, a copolymer of acrylamide and t-butyl acrylate, and any combination thereof.

In other various embodiments, the sealant composition of the present treatment fluids may comprise a mixture of crosslinkable monomers, in which at least a portion of the crosslinkable monomers comprise an acrylate monomer. That is, in some embodiments, the sealant composition may initially be present in an unpolymerized state, with polymerization and crosslinking taking place within a subterranean formation to form a fluid seal. In some embodiments, such sealant compositions may comprise at least a 2-hydroxyethyl acrylate monomer. In some embodiments, 2-hydroxyethyl acrylate may become gelled in the presence of a bifunctional monomer.

In some embodiments, the sealant compositions described herein may further comprise at least one gel time modifier so as to allow their gel times to be tailored to a needed degree. Suitable gel time modifiers may be gel time accelerators in some embodiments or gel time retarders in other embodiments, depending on whether one wants to increase or decrease the rate of gelation for a particular application.

In some embodiments, suitable gel time modifiers for use in combination with organic crosslinking agents may include, for example, pH-modifying agents such as, for example, inorganic acids, organic acids, organic salts, and inorganic salts. Illustrative examples of pH-modifying agents can include, for example, alkali metal carbonates, bicarbonates, acetates, formates, and hydroxides; organic acids (e.g., phenols and acetic acid); mineral acids (e.g., hydrochloric acid); and Lewis acids (e.g., boric acid). Illustrative gel time retarders that may be used in the present embodiments include, for example, transition metal salts that can coordinate the organic crosslinking agent and acid anhydrides that can at least partially acylate amino groups in the organic crosslinking agent.

In some or other embodiments, a suitable gel time modifier for use in combination with an organic crosslinking agent may comprise a quaternary ammonium compound. Suitable quaternary ammonium compounds may include tetraalkylammonium salts. Illustrative tetraalkylammonium salts that may be suitable for use in the present embodiments can include, without limitation, tetramethylammonium halides, tetraethylammonium halides, tetrapropylammonium halides, tetrabutylammonium halides, mixtures thereof, and the like. The alkyl groups in the tetraalkylammonium salts can be either straight chain or branched. In some embodiments, the alkyl groups can be the same, and in other embodiments they can be different. Although it is believed that tetraalkylammonium salts having any carbon chain length can be used in the present embodiments, it is believed that smaller alkyl groups (i.e., $<C_4$ alkyl groups) are preferred. In some embodiments, however, tetraalkylammonium salts that have at least one alkyl group larger than a $C_4$ alkyl group can also be used.

In some or other embodiments, a suitable gel time modifier for use in combination with an organic crosslinking agent may comprise an amino alcohol, an oligomeric polyamine having a molecular weight of less than about 400, any salt thereof, any derivative thereof, and any combination thereof, as described in commonly owned U.S. Patent Application Publication 20130000905. Specific examples of amino alcohols that may be suitable for use in the present embodiments can include, for example, ethanolamine, diethanolamine, triethanolamine, propanolamine, any salt thereof, any derivative thereof, and any combination thereof. Specific examples of oligomeric polyamines that may be suitable for use in the present embodiments can include, for example, diethylenetriamine, triethylenetetraamine, tetraethylenepentaamine, any salt thereof, any derivative thereof, and any combination thereof. Depending on their concentration in a treatment fluid, among other factors, amino alcohols and oligomeric polyamines may either reduce or increase the gel time of the sealant composition.

In further embodiments, the treatment fluids described herein may optionally further comprise any number of additional additives commonly used in treatment fluids including, for example, anti-oxidants, polymer degradation prevention additives, relative permeability modifiers, scale inhibitors, corrosion inhibitors, foaming agents, defoaming agents, antifoam agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), lubricants, breakers, delayed release breakers, friction reducers, bridging agents, viscosifiers, weighting agents, solubilizers, pH control agents (e.g., buffers), hydrate inhibitors, consolidating agents, bactericides, and the like. Combinations of these additives can be used as well.

The treatment fluids described herein may be used in various subterranean treatment operations. Such treatment operations vary widely in scope and may include, for example, drilling operations, stimulation operations, remediation operations, and the like. In some embodiments, the sealant composition may form a fluid seal after being introduced into a wellbore penetrating a subterranean formation and at least partially block the flow of a fluid therein. The fluid seal may block an aqueous fluid in some embodiments, or it may block a non-aqueous fluid in other embodiments. The fluid blocked by the fluid seal may comprise a formation fluid in some embodiments. In other various embodiments, a fluid seal may at least partially divert a fluid being introduced to the subterranean formation. At least partially blocking the flow of water in a subterranean formation with a fluid seal can decrease the production of water from the subterranean formation and/or allow less permeable zones of the subterranean formation to be treated with an aqueous treatment fluid, for example.

In some embodiments, methods described herein may comprise: providing a treatment fluid comprising an aqueous carrier fluid, a sealant composition, and a crosslinked polysaccharide composition; introducing the treatment fluid into a wellbore penetrating a subterranean formation; forming the crosslinked polysaccharide composition into a viscosified gel in the wellbore, the viscosified gel substantially spanning the diameter of the wellbore and holding the sealant composition in place; and after forming the crosslinked polysaccharide composition into a viscosified gel in the wellbore, forming a fluid seal in the wellbore with the sealant composition.

In some embodiments, forming the fluid seal in the wellbore may comprise crosslinking the base polymer and the organic crosslinking agent of the sealant composition. Suitable base polymers and organic crosslinking agents include those described above.

Likewise, suitable polysaccharides and inorganic crosslinking agents for use in forming a crosslinked polysaccharide composition in the present methods are set forth above. Any of combination of polysaccharides and inorganic crosslinking agents may be used in the embodiments described herein. For example, in some embodiments, the polysaccharide may comprise a guar, and the inorganic crosslinking agent may comprise a transition metal ion or a borate.

In some embodiments, forming the crosslinked polysaccharide composition into a viscosified gel in the wellbore may comprise removing a shearing force from the treatment fluid. That is, the treatment fluids described herein may exhibit thixotropic behavior, such that they are in a low viscosity state when they are flowing but attain a high viscosity state when they are not. Accordingly, once pumping the treatment fluid into the wellbore stops, the treatment fluid may attain a high viscosity state comprising a viscosified gel.

As discussed above, it is believed that the viscosified gel comprising the crosslinked polysaccharide composition may promote a more uniform placement and distribution of the sealant composition throughout the wellbore (e.g., by inhibiting slumping) by supporting the sealant composition prior to its gelation to form a fluid seal. In more specific embodiments, the viscosified gel may distribute the sealant composition substantially uniformly across the diameter of the wellbore and hold the sealant composition in place substantially without slumping. As used herein, the distribution of the sealant composition across the diameter of the wellbore will be considered to be "substantially uniform" if an amount of the sealant composition present at a given vertical or lateral wellbore position contains sufficient quantities of the sealant composition to form an intact fluid seal around the perimeter of the wellbore at that location. That is, some degree of non-uniformity in the sealant composition distribution in the wellbore may be tolerated within the bounds of still being able to form an intact fluid seal at a given wellbore location. For example, an intact fluid seal may completely shut off the flow of a fluid to or from a subterranean zone through which the wellbore passes. Without utilizing the treatment fluids of the present disclosure, it may be difficult to completely shut off fluid flow to or from a subterranean zone due to slumping. For example, slumping of a sealant composition used alone may result in an unresolved water cresting problem.

In some embodiments, the wellbore may comprise a substantially horizontal section, and the treatment fluid may be placed in the substantially horizontal section, such that it forms a fluid seal therein. As discussed above, slumping of a sealant composition in horizontal wellbores can be particularly problematic, and the treatment fluid embodiments described herein may help alleviate such slumping issues. It is to be recognized, however, that other wellbore configurations may also benefit from the treatment fluid embodiments described herein. For example, use of the treatment fluids described herein may allow a longer interval of a substantially vertical portion of a wellbore to have a fluid seal formed therein than would be possible if slumping were taking place.

In other various embodiments, systems configured for delivering the treatment fluids described herein to a downhole location are described. In various embodiments, the systems can comprise a pump fluidly coupled to a tubular, the tubular containing a treatment fluid comprising an aqueous carrier fluid, a sealant composition, and a crosslinked polysaccharide composition, the treatment fluid being thixotropic.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 1:
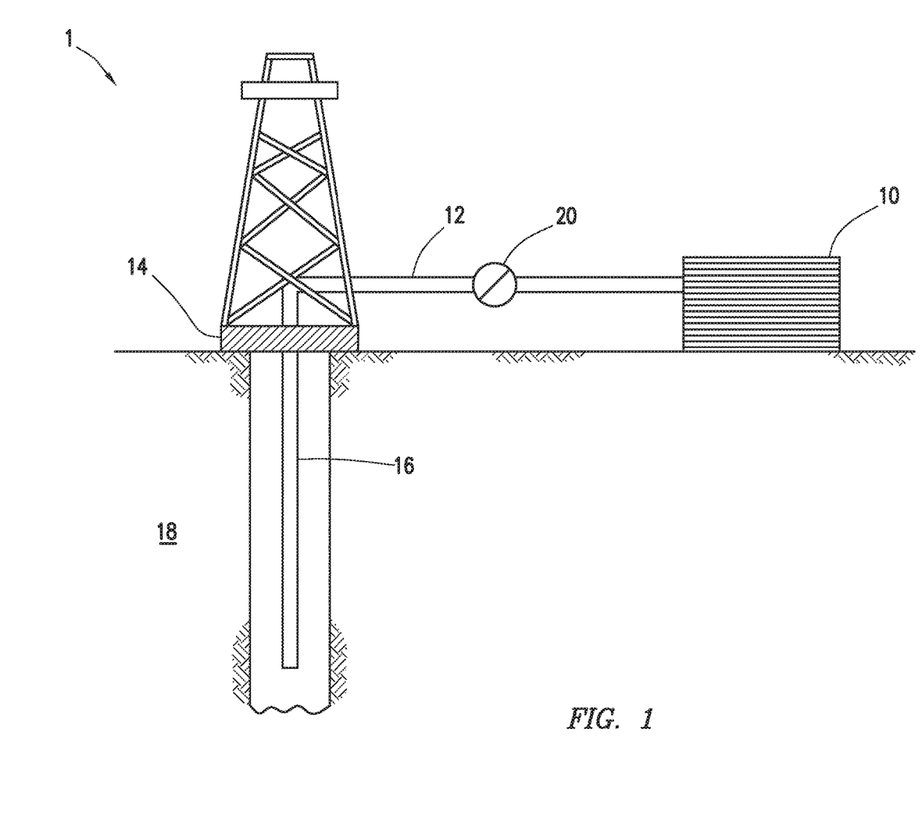
FIG. 1 shows an illustrative schematic of a system that can deliver treatment fluids of the present disclosure to a downhole location, according to one or more embodiments.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the fluid to enter into the subterranean formation. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from the subterranean formation.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for forming a fluid seal in a wellbore. The methods comprise: providing a treatment fluid comprising an aqueous carrier fluid, a sealant composition, and a crosslinked polysaccharide composition; introducing the treatment fluid into a wellbore penetrating a subterranean formation; forming the crosslinked polysaccharide composition into a viscosified gel in the wellbore, the viscosified gel substantially spanning the diameter of the wellbore and holding the sealant composition in place; and after forming the crosslinked polysaccharide composition into a viscosified gel in the wellbore, forming a fluid seal in the wellbore with the sealant composition.

B. Treatment fluids containing non-interfering crosslinkable polymers. The treatment fluids comprise: an aqueous carrier fluid; a sealant composition; and a crosslinked polysaccharide composition; wherein the treatment fluid is thixotropic.

C. Systems for delivering a treatment fluid to a downhole location. The systems comprise: a pump fluidly coupled to a tubular, the tubular containing a treatment fluid comprising an aqueous carrier fluid, a sealant composition, and a crosslinked polysaccharide composition, the treatment fluid being thixotropic.

Each of embodiments A, B and C may have one or more of the following additional elements in any combination:

Element 1: wherein the viscosified gel distributes the sealant composition substantially uniformly across the diameter of the wellbore and holds the sealant composition in place substantially without slumping.

Element 2: wherein the sealant composition comprises a base polymer and an organic crosslinking agent.

Element 3: wherein forming the fluid seal in the wellbore comprises crosslinking the base polymer and the organic crosslinking agent.

Element 4: wherein the sealant composition and the crosslinked polysaccharide composition do not substantially interfere with the crosslinking of each other.

Element 5: wherein the crosslinked polysaccharide composition comprises an inorganic crosslinking agent.

Element 6: wherein the base polymer comprises an acrylamide monomer unit or a derivative thereof.

Element 7: wherein the base polymer comprises a copolymer selected from the group consisting of a partially hydrolyzed polyacrylamide, a copolymer of acrylamide and t-butyl acrylate, and any combination thereof.

Element 8: wherein the organic crosslinking agent comprises a crosslinking polymer selected from the group consisting of polyethyleneimine, polyvinylamine, any derivative thereof, any salt thereof, and any combination thereof.

Element 9: wherein the sealant composition comprises a mixture of crosslinkable monomers, at least a portion of the crosslinkable monomers comprising an acrylate monomer.

Element 10: wherein the crosslinked polysaccharide composition comprises a polysaccharide and a crosslinking agent.

Element 11: wherein the polysaccharide comprises a guar.

Element 12: wherein the crosslinking agent comprises an inorganic crosslinking agent selected from the group consisting of a borate crosslinker, a metal ion crosslinker, and any combination thereof.

also provided in the Table. Lipping gels in the absence of the sealant composition natively broke to a reduced viscosity state within 2 weeks, whereas the rigid gels were visually stable for at least one month.

TABLE 1

| Polysaccharide | Polysaccharide Crosslinking Agent | Sealant Composition | Initial Treatment Fluid Appearance | Treatment Fluid Appearance After 24 Hours |
|---|---|---|---|---|
| guar | borate ion | — | lipping gel | lipping gel |
| guar | borate ion | polyacrylamide + polyethyleneimine | lipping gel | rigid gel |
| guar | titanium ion | — | lipping gel | lipping gel |
| guar | borate ion | mixture of acrylate monomers | lipping gel | rigid gel |
| guar | multi-functional borate ion | polyacrylamide + polyethyleneimine | lipping gel | rigid gel |

Element 13: wherein the wellbore comprises a substantially horizontal section, the treatment fluid being placed in the substantially horizontal section of the wellbore and the fluid seal being formed therein.

Element 14: wherein the treatment fluid is thixotropic.

By way of non-limiting example, exemplary combinations applicable to A, B and C include:

The method of A in combination with elements 1 and 2.
The method of A in combination with elements 2 and 3.
The method of A in combination with elements 2 and 5.
The method of A in combination with elements 4 and 14.
The method of A in combination with elements 2, 6 and 8.
The method of A in combination with elements 9, 10 and 12.
The method of A in combination with elements 2, 5 and 13.
The method of A in combination with elements 2, 5, 7, 12 and 13.
The treatment fluid of B or the system of C in combination with elements 2 and 5.
The treatment fluid of B or the system of C in combination with elements 2, 5 and 6.
The treatment fluid of B or the system of C in combination with elements 5, 6 and 8.
The treatment fluid of B or the system of C in combination with elements 2, 5, 7 and 12.
The treatment fluid of B or the system of C in combination with elements 7 and 10-12.

To facilitate a better understanding of the embodiments of the present disclosure, the following examples of preferred or representative embodiments are given. In no way should the following examples be read to limit, or to define, the scope of the disclosure.

EXAMPLES

Example 1

Exemplary Gel Morphologies

Exemplary treatment fluids were formulated in fresh water with the compositions set forth in Table 1 below, with the crosslinking agent for the polysaccharide being added last. Illustrative concentrations of each component are exemplified in the treatment fluid of Example 2 below. Visual appearances of the treatment fluids after initial mixing and after standing for 24 hours at room temperature are As shown in Table 1, the sealant composition did not appear to appreciably interfere with the crosslinking and gel morphology of the crosslinked polysaccharide. Likewise, the crosslinked polysaccharide did not appear to appreciably affect the gel morphology of the sealant composition.

Example 2

Rheology of an Exemplary Treatment Fluid

A treatment fluid was formulated in fresh water with 0.48 wt. % guar, 0.01375 wt. % borate crosslinker, 36.5 wt. % polyacrylamide solution (20% in water), and 0.33 wt. % polyethyleneimine solution (30% in water). The borate crosslinker was added last. A reference treatment fluid with like concentrations of polyacrylamide and polyethyleneimine but lacking the guar and borate crosslinker was also formulated.

Figure 2:
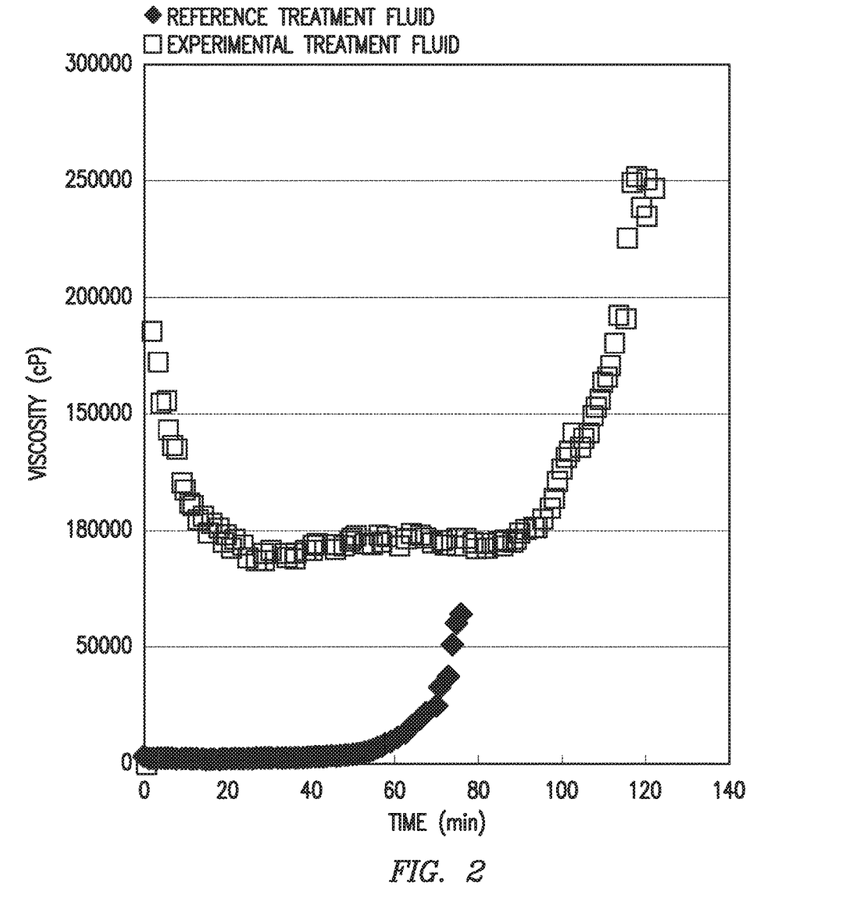
FIG. 2 shows a comparative plot of the viscosities as a function of time for an experimental treatment fluid containing crosslinked guar and a sealant composition and a reference treatment fluid lacking the crosslinked guar.
Figure 3:
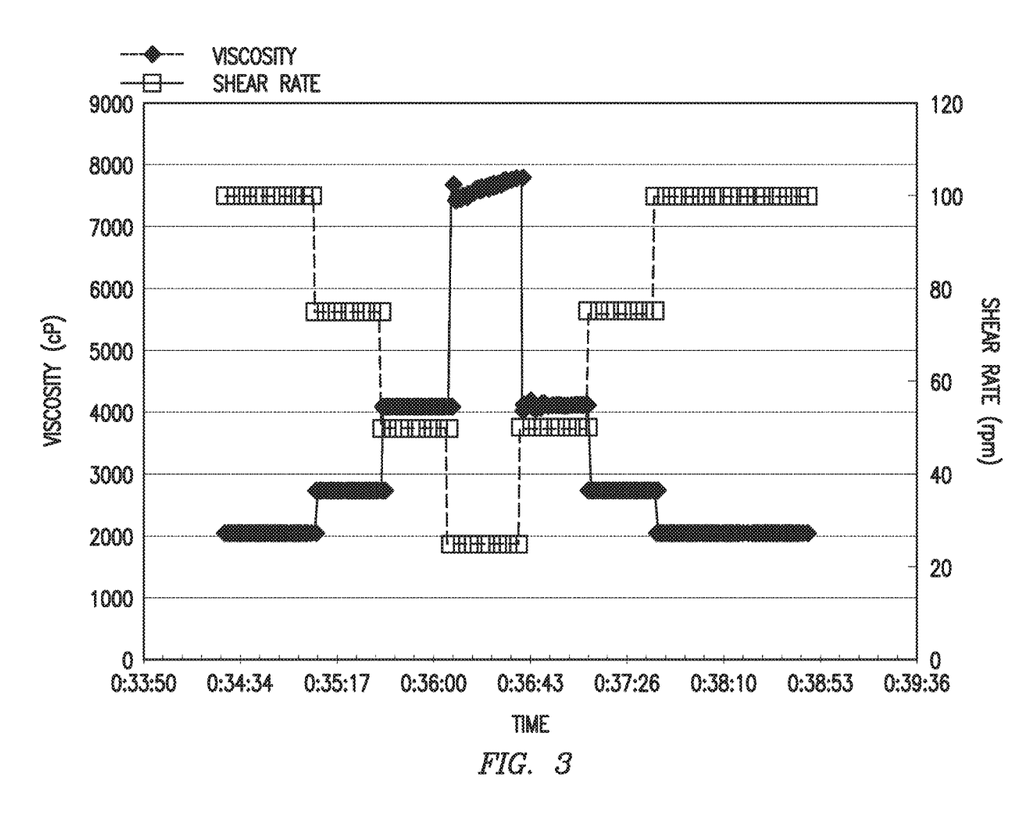
FIG. 3 shows an illustrative plot of shear viscosity for an experimental treatment fluid containing crosslinked guar and a sealant composition.

The viscosities of the two treatment fluids were measured over time at 140° F. using a Brookfield viscometer. FIG. 2 shows a comparative plot of the viscosities as a function of time for an experimental treatment fluid containing crosslinked guar and a sealant composition and a reference treatment fluid lacking the crosslinked guar. As shown in FIG. 2, the gel time of the experimental treatment fluid was about 100 minutes, as compared to about 60 minutes in the reference treatment fluid. Although there is some difference between the gel times of the two treatment fluids, this difference is not considered to be particularly significant from an experimental or operational standpoint. FIG. 3 shows an illustrative plot of shear viscosity for an experimental treatment fluid containing crosslinked guar and a sealant composition. As shown in FIG. 3, the treatment fluid exhibited thixotropic behavior, with the treatment fluid having a low viscosity when the shear rate was high and a high viscosity when the shear rate was low.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While embodiments are described in terms of "comprising," "containing," or "including" various components or steps, the embodiments can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is the following:

1. A method comprising:
   providing a treatment fluid comprising an aqueous carrier fluid, a sealant composition, and a crosslinked polysaccharide composition for providing an initial viscosity in the treatment fluid;
   introducing the treatment fluid into a wellbore penetrating a subterranean formation;
   forming the crosslinked polysaccharide composition into a viscosified gel in the wellbore, the viscosified gel spanning the diameter of the wellbore, holding the sealant composition in place, and mitigating slumping effects; and
   after forming the crosslinked polysaccharide composition into the viscosified gel in the wellbore, forming a fluid seal in the wellbore with the sealant composition.

2. The method of claim 1, wherein the viscosified gel distributes the sealant composition uniformly across the diameter of the wellbore and holds the sealant composition in place without slumping.

3. The method of claim 1, wherein the sealant composition comprises a base polymer and an organic crosslinking agent.

4. The method of claim 3, wherein forming the fluid seal in the wellbore comprises crosslinking the base polymer and the organic crosslinking agent.

5. The method of claim 4, wherein the sealant composition and the crosslinked polysaccharide composition do not interfere with the crosslinking of each other.

6. The method of claim 3, wherein the crosslinked polysaccharide composition comprises an inorganic crosslinking agent.

7. The method of claim 3, wherein the base polymer comprises an acrylamide monomer unit or a derivative thereof.

8. The method of claim 7, wherein the base polymer comprises a copolymer selected from the group consisting of a partially hydrolyzed polyacrylamide, a copolymer of acrylamide and t-butyl acrylate, and any combination thereof.

9. The method of claim 3, wherein the organic crosslinking agent comprises a crosslinking polymer selected from the group consisting of polyethyleneimine, polyvinylamine, any derivative thereof, any salt thereof, and any combination thereof.

10. The method of claim 1, wherein the sealant composition comprises a mixture of crosslinkable monomers, at least a portion of the crosslinkable monomers comprising an acrylate monomer.

11. The method of claim 1, wherein the crosslinked polysaccharide composition comprises a polysaccharide and a crosslinking agent.

12. The method of claim 11, wherein the polysaccharide comprises a guar.

13. The method of claim 11, wherein the crosslinking agent comprises an inorganic crosslinking agent selected from the group consisting of a borate crosslinker, a metal ion crosslinker, and any combination thereof.

14. The method of claim 1, wherein the wellbore comprises a horizontal section, the treatment fluid being placed in the horizontal section of the wellbore and the fluid seal being formed therein.

15. The method of claim 1, wherein the treatment fluid is thixotropic.

16. A system comprising:
   a pump fluidly coupled to a tubular, the tubular containing a treatment fluid comprising an aqueous carrier fluid, a sealant composition, and a crosslinked polysaccharide composition for providing an initial viscosity in the treatment fluid, the crosslinked polysaccharide composition forming into a viscosified gel in a wellbore and mitigating slumping effects, and the treatment fluid being thixotropic.

* * * * *